United States Patent [19]

Ström

[11] 4,223,896
[45] Sep. 23, 1980

[54] SEALING RING

[75] Inventor: Torsten E. T. Ström, Fristad, Sweden

[73] Assignee: AB Gustavsberg, Fristad, Sweden

[21] Appl. No.: 20,064

[22] Filed: Mar. 13, 1979

[51] Int. Cl.³ .......................... F16J 15/24; F16J 15/32
[52] U.S. Cl. ............................ 277/207 A; 277/206 R;
    285/230; 285/231; 285/345; 285/110
[58] Field of Search ............... 285/110, 230, 231, 345,
    285/DIG. 19; 277/207 R, 207 A, 152, 165, 125,
    205, 206 R

[56] References Cited
U.S. PATENT DOCUMENTS

| | | | |
|---|---|---|---|
| 2,146,641 | 2/1939 | McWane | 285/231 X |
| 2,245,153 | 6/1941 | McWane | 285/231 |
| 3,315,971 | 4/1967 | Sakurada | 285/231 X |
| 3,390,890 | 7/1968 | Kurtz | 277/205 |

FOREIGN PATENT DOCUMENTS

| | | | |
|---|---|---|---|
| 1250700 | 9/1967 | Fed. Rep. of Germany | 277/207 A |
| 1569442 | 5/1969 | France | 285/231 |
| 481342 | 11/1969 | Switzerland | 285/110 |
| 454900 | 10/1936 | United Kingdom | 277/207 A |
| 1014364 | 12/1965 | United Kingdom | 277/207 A |

Primary Examiner—Robert S. Ward, Jr.
Attorney, Agent, or Firm—Finnegan, Henderson, Farabow, Garrett & Dunner

[57] ABSTRACT

A sealing ring to be received by an annular groove in one of two pipe elements which can be inserted one into the other, to seal between the pipe elements. The sealing ring comprises two integrated portions of different hardnesses, forming two surfaces enclosing an obtuse angle one of said surfaces being formed by the harder portion and the other one by the softer portion.

15 Claims, 9 Drawing Figures

SEALING RING

The invention relates to a sealing ring to be received in an annular groove in one of two pipe elements which can be inserted one into the other, to seal between the pipe elements.

The sealing ring according to the invention is of the type forming two surfaces enclosing an obtuse angle, said surfaces facing outwardly from the groove when the sealing ring is received therein with one surface directed obliquely outwards from the groove to be engaged by the other one of said pipe elements when the pipe elements are inserted one into the other and with the other surface located substantially in the longitudinal direction of the pipe wall to be compressed against said other pipe element by a turning movement of the sealing ring in the groove provided by said other pipe element engaging said one surface.

The invention also relates to a joint between pipe elements including a sealing ring according to the invention.

The sealing ring according to the invention has been developed especially for pipes of plastic material, e.g. such pipes as are used in sewage conduits comprising pipe lengths with a socket at one end thereof. An inside annular groove is provided in the socket for receiving the sealing ring which engages the outside of a joining smooth pipe end inserted into the socket, to seal the joint thus provided between the telescoped pipe ends. The prior art has utilized sealing rings of circular or oval cross-sectional form. For a more effective sealing, ribs in different combinations and configurations may be provided on the sealing ring. In the prior art, to enable the pipe end being inserted into the socket to slide over the sealing ring and compress the sealing ring in the annular groove said pipe end must be bevelled at the outside thereof in order to avoid that the sharp edge of the pipe end cuts into the sealing ring damaging the same. If no bevelling is provided on the insert pipe end it may also be difficult to push said pipe end to proper position in the socket. The necessity of bevelling the insert pipe end involves additional work not only in manufacturing the pipes in standard lengths in the factory but also at the working places where it is often necessary to cut a pipe to the length required in a specific case. A slip agent frequently is used in order to facilitate the telescoping of the pipe ends but such slip agent eventually will oxidise, whereby the pipe ends get stuck and accordingly are unable to move in relation to each other as is necessary at expansion and contraction due to temperature variations.

A prior art sealing ring for pipes and particularly pipes which are made of a helically wound metal strip, has V-shaped cross-sectional form. The sealing ring is received in an outside annular groove in one of the pipe elements to be joined to each other. One limb of the sealing ring initially rests on the bottom of the groove while the other limb projects therefrom. When the other pipe element is telescoped over said one pipe element the end of said other element will engage the projecting limb of the sealing ring which is tilted to be sealingly engaged between the pipe elements. The sealing ring is made of a homogeneous material of a unitary hardness, and since the sealing ring must be relatively soft in order to effectively seal between the pipe elements there is a risk that said other pipe element cuts into the projecting limb or that the sealing ring is unable to provide the necessary engagement pressure when tilted.

It is a primary object of this invention to provide a new and improved sealing ring of the type referred to above which can be used in connecting pipe elements without the necessity of bevelling one or the other of the pipe elements to be interconnected.

It is a further object of this invention to provide a new and improved sealing ring which facilitates the telescoping of the pipe elements without slip agent being used.

A still further object of this invention is to provide a sealing ring which forms an effective and reliable seal in pipe joints wherein the pipes are free to move in relation to each other due to expansion and contraction at temperature variations.

Yet another object of this invention is to provide a sealing ring which also acts as locking means preventing the pipe elements from being separated.

It is also an object of this invention to provide a sealing ring which forms an effective and reliable seal in pipe joints of sewage conduits in the ground where the joints may be deformed due to the pressure of the covering material or the joined pipes may be angled at the joint due to displacement of the ground material.

Additional objects and advantages of the invention in part will be set forth in the description which follows and in part will be obvious from the description, or may be learned by practice of the invention. The objects and advantages of the invention may be realized and attained by means of the instrumentalities and combinations particularly pointed out in the appended claims.

To achieve the foregoing objects and in accordance with the purpose of the invention, as embodied and broadly described herein, the sealing ring of this invention is of the type referred to above, and according to the invention the sealing ring comprises integrated portions of different hardnesses, a harder portion forming said one surface and a softer portion forming said other surface.

Preferably, the harder portion forms the major part of the sealing ring and the major part of the surface of the sealing ring to be engaged with the surface of the groove.

It is also preferred that the surface of the sealing ring adapted to engage the surface of the groove be substantially circularly curved and that the groove receiving the sealing ring have substantially rectangular cross-sectional form.

The accompanying drawings which are incorporated in and constitute a part of this specification, illustrate embodiments of the invention and, together with the description, serve to explain the principles of the invention.

Reference will now be made in detail to the present preferred embodiments of the invention, examples of which are illustrated in the accompanying drawings.

Figure 1:
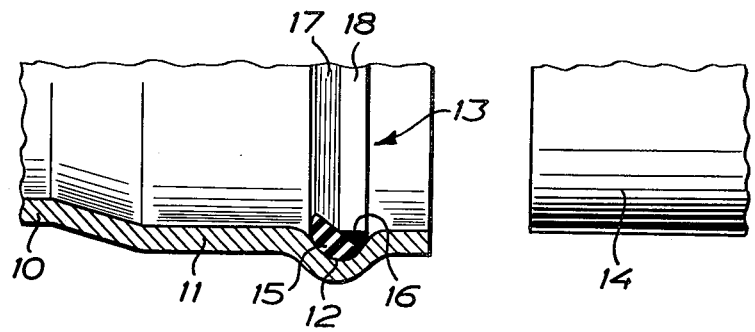
FIG. 1 is a half longitudinal cross-sectional view of a pipe end formed with a socket and provided with a sealing ring according to the invention, and a half side view of a pipe end to be inserted into the socket.
Figure 2:
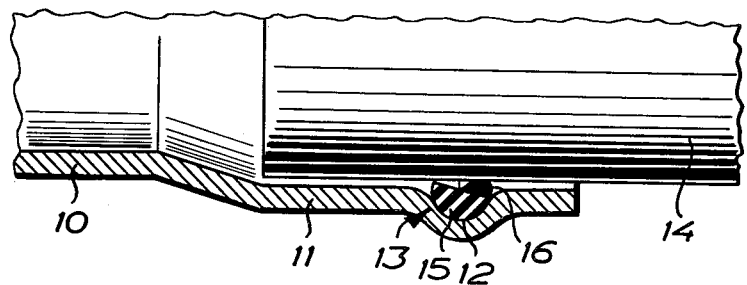
FIG. 2 shows in a similar way as FIG. 1 one pipe inserted into the other.

Referring to FIGS. 1 and 2, a cylindric pipe element 10 forms a socket 11 with an inside annular groove 12 wherein a circular resilient sealing ring 13 is located. A cylindric pipe end 14 having a smooth outside surface is shown separated from the pipe element 10 in FIG. 1 while it is inserted into the socket 11 of the pipe element 10 in FIG. 2, the sealing ring 13 in the annular groove 12 sealingly engaging the telescoped pipe elements.

Figure 3:
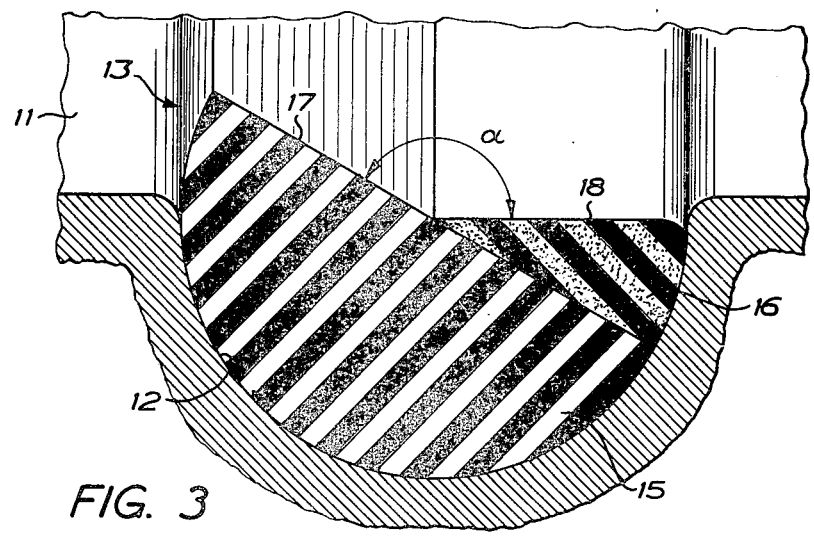
FIG. 3 is an enlarged transverse cross-sectional view of the sealing ring and the receiving groove.

The annular groove 12 in the socket 11 is curved circularly as is more clearly illustrated in FIG. 3. With reference to FIG. 3, the sealing ring embodying the features of the invention comprises a body portion 15 of semi-circular cross-sectional form and a portion 16 the cross section of which is a circle sector having substantially the same radius as the portion 15. The portions 15 and 16 are interconnected to an integrated unit and form together a circularly curved outside surface of the sealing ring while the inside surface of the sealing ring is formed by two annular surfaces 17 and 18 which each has a straight generatrix and form an angle α therebetween, the surface 17 being a conical surface on the ring and the surface 18 a cylindrical surface on the ring. The angle α can be about 150°. It is not necessary that the angle be as pronounced as shown; the surfaces 17 and 18 can join each other by a gentle curvature such that they form together a substantially concave inside surface on the sealing ring.

When the sealing ring is located in the annular groove 12 thereof as is shown in FIGS. 1 and 3 before the pipe end 14 being inserted into the socket 11, the surface 17 projects obliquely from the groove while the surface 18 extends in the longitudinal direction of the inside surface of the socket somewhat below or flush with said surface, as is clearly seen in FIG. 3. When the pipe end 14 is being inserted into the socket 11 to the position according to FIG. 2, the annular end surface of the pipe will hit the surface 17 at the edge thereof and sliding against this surface at the continued insertion of the pipe end 14 into the socket 11 will push the sealing ring 13 aside such that the sealing ring will turn in the groove 12 in the anti-clockwise direction as seen in FIGS. 1 and 3, the surface 18 being elevated from the groove and compressed against the smooth outside of the pipe end 14. FIG. 2 shows how the portion 16 is compressed between the portion 15 and the outside surface of the pipe end 14 when the sealing ring is turned by being depressed at the surface 17 by the pipe 14. The turning movement will be allowed by the inherent resiliency of the sealing ring, and the curved outside surface of the sealing ring slides against the curved bottom of the groove 12 during such movement.

In order that the sealing ring will be pushed aside as easily as possible while being turned when the pipe end 14 at the outer edge of the annular end surface thereof slides against the surface 17, without using a slip agent and without the risk of said edge of the pipe end 14 cutting into the surface 17, said surface 17 should be a hard and smooth surface. In the optimal embodiment of the sealing ring according to the invention this is achieved by the portion 15 being made of a relatively hard material while on the contrary the portion 16 in order to provide the necessary sealing against the pipe end 14 should be made of a relatively soft material and in any case of a material which is softer than the material of the portion 15. Because the outside curved surface of the sealing ring to a major part is formed by the portion 15 and to a minor part by the portion 16, the surface of the sealing ring, sliding against the surface of the annular groove 12 when the ring is being turned, to a major extent will be of the same nature as the surface 17, i.e. a hard and smooth surface.

The sealing ring is preferably made of rubber such as silicone rubber or thermoplastic rubber, the two portions 15 and 16 comprising different types of rubber qualities. These portions are vulcanized together and preferably portion 15 has a hardness of at least 80° Shore, and portion 16 a hardness of 40° or 50° Shore. Other rubber qualities as well as other materials such as different types of plastics, particularly thermoplastics, may be used in order to meet specific requirements. However, when choosing the material of the body portion 15 it must be kept in mind that the pipe end 14 shall be able to slide unobstructedly along the surface 17 and that the sealing ring shall be able to slide unobstructedly against the surface of the annular groove 12 while the ring is being turned, and also that the pressure exerted by the pipe end shall be transferred by the body portion 15 to the softer portion 16.

The portion 16 may form a larger part of the total cross section of the sealing ring than that shown in FIGS. 1 to 3, but considering the fact that a softer rubber material as a rule is more expensive than a harder one, it may be of interest to make this portion as small as possible, as long as the necessary sealing effect is provided thereby when the portion is being compressed. It is advantageous if the portion 16 has a sufficient mass in order to bulge towards and sealingly engage the surface of the annular groove 12 when pressed against the pipe end 14, particularly where the surface of the groove joins the inside cylindrical surface of the pipe 10. The surface 18 can be formed with ribs in different combinations and configurations in order to achieve a desired sealing effect. A metal plate, possibly a slotted metal plate, may be attached to the body 15 to form the surface 17.

Figure 4:
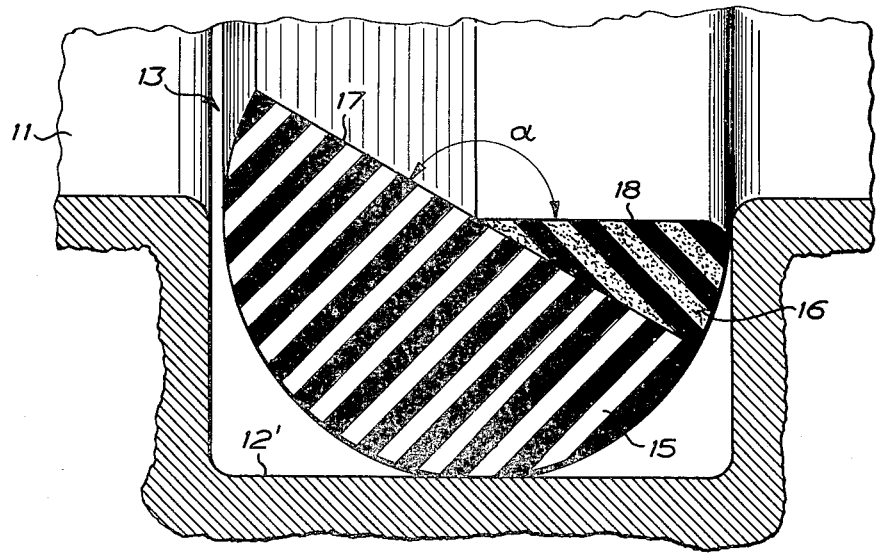
FIG. 4 is a transverse cross-sectional view of the ring in FIG. 3 but inserted into a groove having another cross-sectional form.

In FIG. 4 a sealing ring 13 as that shown in FIG. 3 is located in an annular groove 12' in the socket 11 of substantially rectangular cross-sectional form. The sealing ring operates in the same manner as described above. The side walls of the groove are perpendicular to the bottom but can form a greater angle to the bottom, e.g. 100°, so that the groove is flared from the bottom to the mouth. The rectangular cross-sectional form is the preferred form of the groove receiving the sealing ring of the present invention.

Figure 5:
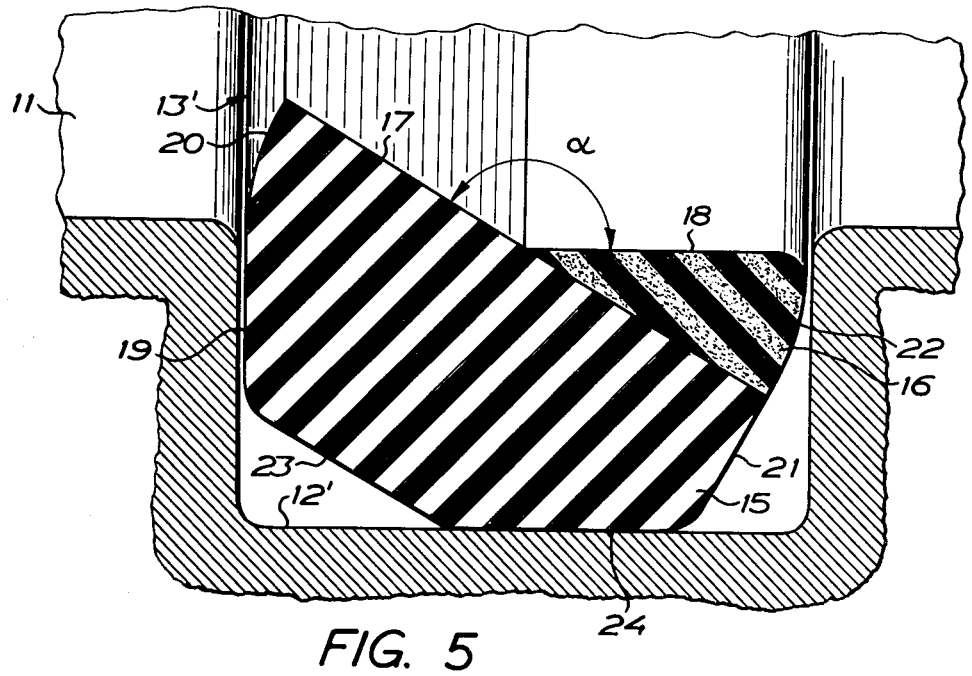
FIG. 5 is a cross-sectional view similar to FIG. 4 of a modified embodiment of the sealing ring according to the invention.

In the embodiment according to FIG. 5, the sealing ring designated 13' has another cross-sectional form than that in FIGS. 1 to 4, and is located in an annular groove 12' of the same type as that in FIG. 4. The surfaces 17 and 18 as well as the portion 16 are as in the embodiment of FIGS. 3 and 4 while the portion 15 has a substantially polygonal cross-sectional form. Between a straight side 19 joining the surface 17 at a circularly curved side portion 20 and a straight side 21 joining the circularly curved outside surface, designated 22, of the portion 16 the portion 15 has two straight sides 23 and 24 forming an obtuse angle therebetween. When the sealing ring 13' is located in the groove 12' it rests initially against the bottom of the groove at the side 24 as is shown in FIG. 5 but when the pipe end 14 is inserted into the socket and is engaged with the surface 17 the sealing ring will tilt so as to rest against the bottom of the groove 12' at the side 23 when the surface 18 of the portion 16 is engaged with and compressed against the outside surface of the pipe end 14. The tilting of the sealing ring from the position of FIG. 5 to the position wherein the side 23 engages the bottom of the groove 12' takes place under some small displacement of the sealing ring along the bottom of the annular groove to the right of FIG. 5.

Figure 6:
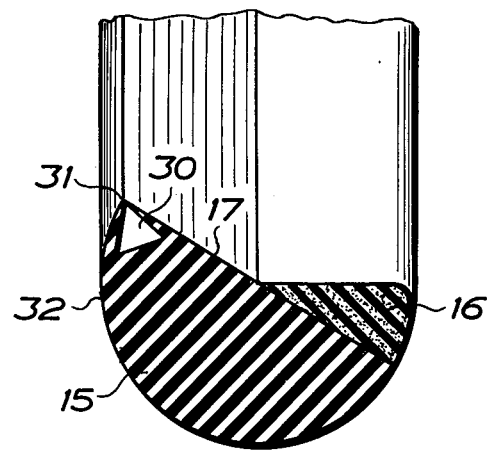
FIG. 6 is a cross-sectional view of a further embodiment of the sealing ring.
Figure 7:
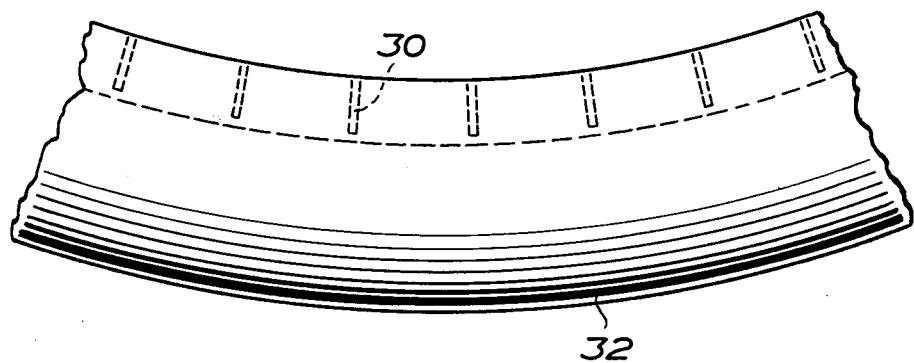
FIG. 7 is a fragmentary end view of the sealing ring shown in FIG. 6 as seen from the left in FIG. 6.

With reference to FIGS. 6 and 7, the sealing ring comprises a number of metal washers 30 embedded into the body portion 15 below the conical inside surface 17. The washers 30 are spaced circumferentially and are formed as regular triangles having an angle located in the corner 31 between the surface 17 and the outside surface 32 of the sealing ring.

When the sealing ring is in operative position as shown in FIG. 2, the metal washers 30 will engage the pipe end 14 at the angles uncovered at the corner 31 in order to prevent withdrawing of the pipe end 14 from the socket 11.

The location of the metal washers 30 in proper position in the material of the sealing ring will be facilitated if the washers are interconnected e.g. by means of a circumferentially extending wire ring. The metal washers can have another form than the triangular form shown herein. However, it is essential that a sharp edge or angle on the washer is uncovered in the corner 31 between surfaces 17 and 32.

Figure 8:
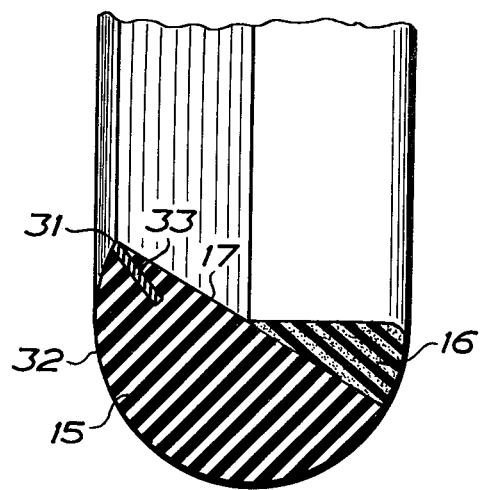
FIG. 8 is a cross-sectional view corresponding to FIG. 6 of a further modified embodiment of the sealing ring.
Figure 9:
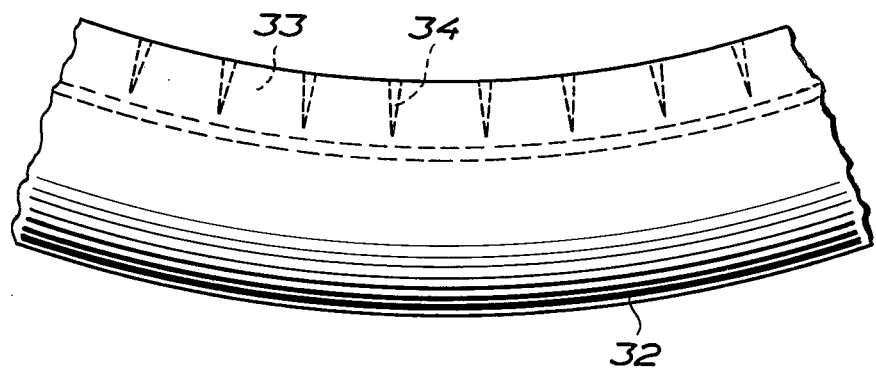
FIG. 9 is an end view corresponding to FIG. 7 of the sealing ring shown in FIG. 8.

In the embodiment shown in FIGS. 8 and 9 the individual metal washers are replaced by a circular metal ring 33 a peripheral edge of which is located in the corner 31 between surfaces 17 and 32. The ring 33 has a number of V-shaped slots 34 in said edge in order that the metal ring shall not prevent or interfere with the deformation of the sealing ring occurring when the two pipe elements are inserted one into the other. In the same manner as described with reference to FIGS. 1 and 2 the metal ring 33 will engage with the inserted pipe end at the slotted edge to prevent separation of the pipe elements.

The sealing ring provided with metal washers or a metal ring may have the polygonal form shown in FIG. 5.

In FIGS. 8 and 9, the tongues formed by the metal ring between the slots 34 may be bent in order to have portions thereof extending substantially in a radial plane of the sealing ring.

When the sealing ring is constructed as shown in FIGS. 6 and 7 or in FIGS. 8 and 9, it provides a locking action and thus can be considered as a sealing quick-coupling between pipe elements.

It will be apparent to those skilled in the art that various other modifications and variations in addition to those mentioned above could be made in the sealing ring of the invention without departing from the scope and spirit of the invention.

I claim:

1. A sealing ring received by an annular groove in one of two pipe elements, the other of which pipe elements can be inserted into the one element to form telescoped pipe elements, said sealing ring sealing between the pipe elements, comprising: two integrated portions of different hardnesses, said portions forming two surfaces enclosing an obtuse angle, one of said surfaces being formed by the harder portion and the other one by the softer portion, said surfaces facing outwardly from the groove when the sealing ring is received therein with said one surface directed obliquely outwards from the groove to be engaged by the other of said pipe elements when the other pipe element is inserted into the one pipe element and with said other surface located substantially in the longitudinal direction of the pipe wall to be compressed against said other pipe element by a turning movement of the sealing ring in the groove provided by said other pipe element engaging said one surface.

2. A sealing ring according to claim 1 wherein the harder portion forms the major part of the sealing ring and the major part of the surface of the sealing ring to be engaged with the surface of the groove.

3. A sealing ring according to claim 1 wherein at least the harder portion has a smooth surface.

4. A sealing ring according to claim 1 wherein the surfaces forming an obtuse angle are surfaces having a straight generatrix.

5. A sealing ring according to claim 1 wherein the surfaces forming an obtuse angle join each other by a gentle curvature in order to form a substantially concave inside surface on the sealing ring.

6. A sealing ring according to claim 1 wherein the surface of the sealing ring adapted to engage the surface of the groove is substantially circularly curved.

7. A sealing ring according to claim 1 wherein the surface of the sealing ring to be engaged with the surface of the groove is of polygonal form.

8. A sealing ring according to claim 7 further comprising two sides forming an obtuse angle to engage a bottom surface of the groove at one side when said one surface projects from the groove, and at the other side when said other surface is pressed against said other pipe element.

9. A sealing ring according to claim 1 wherein the sealing ring is made of materials of different hardness selected from the group consisting of rubber, thermoplastic rubber and plastics.

10. A sealing ring according to claim 9 wherein the harder portion has a hardness of at least 80° Shore and the softer portion a hardness of 40° or 50° Shore.

11. A sealing ring according to claim 1 wherein at least one metal element is embedded into the material of the sealing ring below said one surface, said element having an uncovered edge or angle in the corner between said one surface and the joining outside surface of the sealing ring to lockingly engage said other pipe element, preventing separation of the pipe elements.

12. A sealing ring according to claim 11 wherein said metal element comprises a number of substantially radially located metal washers spaced circumferentially.

13. A sealing ring according to claim 12 wherein each washer has an angle located in said corner.

14. A sealing ring according to claim 11 wherein said metal element comprises a circumferential metal ring having a peripheral edge located at said corner.

15. A sealing ring according to claim 14 wherein the metal ring has substantially radial slots at said peripheral edge.

* * * * *